United States Patent [19]

Blaurock et al.

[11] Patent Number: 4,474,073
[45] Date of Patent: * Oct. 2, 1984

[54] SPINDLE DRIVE ASSEMBLY WITH RECIRCULATING BALLS

[75] Inventors: Günter Blaurock, Niederwerrn; Ernst Albert, Sand, both of Fed. Rep. of Germany

[73] Assignee: Deutsche Star Kugelhalter GmbH

[*] Notice: The portion of the term of this patent subsequent to Jun. 23, 1998 has been disclaimed.

[21] Appl. No.: 207,979

[22] Filed: Nov. 18, 1980

Related U.S. Application Data

[63] Continuation of Ser. No. 060,621, Jul. 25, 1979, abandoned.

[30] Foreign Application Priority Data

Aug. 4, 1978 [DE] Fed. Rep. of Germany ....... 2834299

[51] Int. Cl.³ ............................ F16H 1/20; F16H 1/18
[52] U.S. Cl. .................................. 74/424.8 A; 74/459
[58] Field of Search ................... 74/424.8 A, 424.8 R, 74/424.8 NA, 459

[56] References Cited

U.S. PATENT DOCUMENTS

| | | | |
|---|---|---|---|
| 888,619 | 5/1908 | Kelly | 74/424.8 R |
| 2,166,106 | 7/1939 | Gormley | 74/459 |
| 2,694,942 | 11/1954 | Hellen | 74/459 |
| 3,327,551 | 6/1967 | Prueter | 74/424.8 |
| 3,372,605 | 3/1968 | Orner | 74/459 |
| 3,393,577 | 7/1968 | Better | 74/424.8 A |
| 3,577,796 | 5/1971 | Eissfeldt | 74/459 |

FOREIGN PATENT DOCUMENTS

| | | |
|---|---|---|
| 700304 | 12/1964 | Canada . |
| 1817331 | 7/1960 | Fed. Rep. of Germany . |
| 1128714 | 4/1962 | Fed. Rep. of Germany . |
| 1425918 | 3/1969 | Fed. Rep. of Germany . |
| 1921807 | 11/1969 | Fed. Rep. of Germany . |
| 2061101 | 6/1971 | Fed. Rep. of Germany . |
| 2166275 | 9/1973 | Fed. Rep. of Germany . |
| 2353734 | 5/1974 | Fed. Rep. of Germany . |
| 2437497 | 12/1975 | Fed. Rep. of Germany . |
| 1033040 | 7/1953 | France . |
| 1597152 | 7/1970 | France . |
| 2198589 | 3/1974 | France . |
| 54350 | 3/1943 | Netherlands . |
| 892612 | 3/1962 | United Kingdom . |
| 957330 | 5/1964 | United Kingdom . |
| 2014270 | 8/1979 | United Kingdom . |

OTHER PUBLICATIONS

Doctoral Thesis of Dietmar Spiess, Mar. 30, 1979.
Machines and Tooling, vol. 34, No. 4, pp. 3–8, 1963, G. A. Levit.

Primary Examiner—Leslie A. Braun
Assistant Examiner—M. D. Bednarek
Attorney, Agent, or Firm—Toren, McGeady and Stanger

[57] ABSTRACT

A spindle drive assembly includes a spindle and a spindle nut defining a helical ball duct therebetween through which a plurality of recirculating balls may pass during relative rotation between the spindle and the spindle nut to effect transmission of axial forces therebetween. A helical internal ball guide formed on the spindle nut and defining one side of the helical ball duct is formed with at least one compensating slot which extends to the walls of the helical internal guide in order to effect circumferential division of the spindle nut to enable the spindle nut to radially adapt to compression forces applied by the clamping device extending about the spindle nut to provide radial compression maintaining the balls in operative load-bearing engagement within the helical duct. The slot is formed with a width taken circumferentially of the spindle nut which is not greater than 15% of the diameter of the recirculating balls, and preferably not greater than 10% of the ball diameter.

9 Claims, 5 Drawing Figures

SPINDLE DRIVE ASSEMBLY WITH RECIRCULATING BALLS This is a continuation of application Ser. No. 060,621, filed July 25, 1979, now abandoned.

BACKGROUND OF THE INVENTION

The present invention relates generally to spindle drive assemblies of the type generally including threaded nut and spindle devices having recirculating balls in load-bearing engagement therebetween to transmit axial forces upon relative rotation of the nut and spindle.

In devices of the type to which the present invention relates, the recirculating balls are guided within a helical ball duct defined between a spindle and a spindle nut, with the balls being continuously recirculated through the helical duct and through ball return means provided on the spindle nut which recirculate the balls to and from the helical duct. The spindle nut, which is usually the outer member, is engaged by an outer clamping device which applies radial compression to the spindle nut in order to insure that the recirculating balls are maintained in load-bearing engagement between the nut and the spindle.

At least one compensating slot may be provided in the spindle nut to effect division of the nut in the circumferential direction. The slot may extend to the helical internal ball guide formed on the spindle nut and defining one side of the helical ball duct, and as a result, the balls will travel past the terminal edges of this compensating slot during their recirculating travel through the assembly.

In a spindle nut of the aforementioned type involving recirculating balls, the diameter of the spindle nut may be reduced by the radial clamping forces of the clamping device until radial play is reduced or eliminated, thereby insuring that axial play between the spindle and the spindle nut is also reduced or eliminated. Moreover, by further radial contracting of the spindle nut it is also possible to generate a prestressing of a selected magnitude between the spindle nut, the balls and the spindle so that, even when higher loads are to be transmitted by the spindle drive of the assembly, which could result in subjecting individual elements of the assembly to a certain degree of deformation, freedom from excessive play will nevertheless be insured.

An example of a prior art device of the type discussed may be found in U.S. Pat. No. 888,619. In the device of this patent, the nut is formed in longitudinal sections which are divided circumferentially of the device. This division is generally made for reasons of machining, for example, to enable machining or finishing of a ball return duct of such a device. However, in the assembly of a spindle drive, the two halves of the spindle nut are joined together completely without play so that no slot in the sense of the slot previously mentioned in connection with the present invention is formed and as a result, there will arise problems which result from jolts or shocks when the balls travel past the joint, thereby causing irregular or rough operation of the spindle assembly.

In another prior art device of the type discussed above, the spindle nut is also divided in a longitudinal plane and the resulting halves of the spindle nut remain connected through an elastic web arranged outside of the threaded bore. An example of this type of device may be found in U.S. Pat. No. 2,694,942. The slot which is intersected twice by all the threads of the spindle nut at diametrically oppositely located sides is of a relatively large width. As a result, the spindle nut can be contracted by suitable means to such an extent that the internal threads will assume an elliptical shape. Because of this, in the region of the minor axis of the ellipse, there will be a loss of play between the balls and the threads of the spindle and the spindle nut, while in the region of the major axis of the ellipse the balls will have a distinct play in the circumferential direction and thus also in the axial direction, whereby the balls may not operate to transmit the desired forces through the assembly. The purpose of this measure is to achieve a transfer of the balls without jolting into and out of the return duct by arranging the inlet and the outlet of the return duct in the non-load bearing region of the spindle nut. Since the slots are also arranged in the non-load bearing region of the spindle nut, there will be generally eliminated problems resulting from jolts occurring in spite of the large width of the slots. However, in a prior art device of this type, there arises a significant disadvantage in that only a portion of the balls is utilized for transmitting the forces between the spindle and spindle nut so that contact pressures and wear are significantly increased. Additionally, in the case where predetermined contact pressures are maintained, the spindle drive, and particularly the spindle nut, will have much larger dimensions.

The present invention is directed to providing an improved spindle drive assembly wherein the recirculating balls may move through the helical ball duct of the assembly past the terminal edges of a slot or slots formed in the spindle nut without jolting or rough, uneven operation despite the fact that the balls are maintained under load-bearing condition. Furthermore, the invention seeks to achieve these operating characteristics without causing increased contact pressure due to incomplete utilization of the number of recirculating balls of the assembly and without increasing the structural dimensions of the device.

SUMMARY OF THE INVENTION

Briefly, the present invention may be described as a spindle drive assembly comprising a spindle and a spindle nut having, respectively, helical external and internal ball guides defining therebetween a helical duct through which recirculating balls of the assembly may pass during relative rotation of the spindle and spindle nut in order to transmit axial loads. Ball return means are provided for passing the recirculating balls to and from the helical duct and clamping means are engaged about the spindle nut to apply a radial compression thereto to maintain the balls in operative load-bearing engagement within the helical duct. The assembly of the invention includes at least one compensating slot in the spindle nut extending to the walls of the helical internal ball guide in order to effect a circumferential division of the spindle nut to enable the spindle nut to radially adapt to the compressive forces applied by the clamping means. The invention is particularly directed to the dimensions of the compensating slot which is defined to have a slot width taken circumferentially of the spindle nut which is not greater than 15% of the diameter of the recirculating balls and preferably not greater than 10% of the ball diameter.

It has been found that, when the dimensional relationships recited above are maintained in accordance with the invention, practically no noticeable jolting effects which negatively affect the machining accuracy, will occur when the balls travel past the terminal edges of the compensating slot. This advantageous operating characteristic will be observed even when the balls are under load-bearing engagement. The edge of the slot first engaged by the balls, referred to as the releasing edge, as well as the slot edge last engaged by the balls, or the receiving edge of the slot, will always be maintained a distance apart with relation to the ball diameter so that the ball will essentially be prevented from deviating from a continuous path of travel. As a result, the recirculating balls will not lose contact with the external thread of the spindle which defines the internal side of the helical ball duct.

In a further preferred aspect of the invention, the diameter of the recirculating balls is also maintained within a certain ratio relative to the diameter of the spindle. In accordance with this aspect of the invention, the diameter of the circulating balls is maintained to be no greater than about 20% of the outermost diameter of the spindle, and preferably no more than 15% of the spindle outermost diameter.

Furthermore, in accordance with this aspect of the invention, the width of the slot, which is defined in relation to the diameter of the circulating balls, is also maintained within a certain relationship relative to the diameter of the spindle. Thus, the slot width is also related to the radius of curvature of the ball race. It has been found that if the ratio of slot width to spindle diameter is maintained to be no greater than about 3%, and preferably at most about 1.5%, there results a spindle assembly which is practically completely jolt-free and smooth-running.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
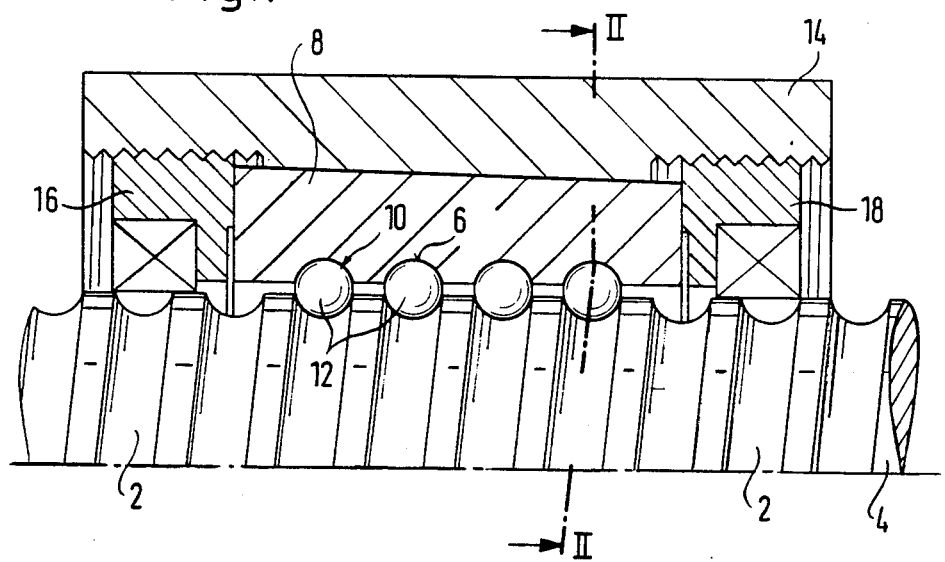
FIG. 1 is a partial longitudinal sectional view taken through a spindle assembly of the present invention.
Figure 2:
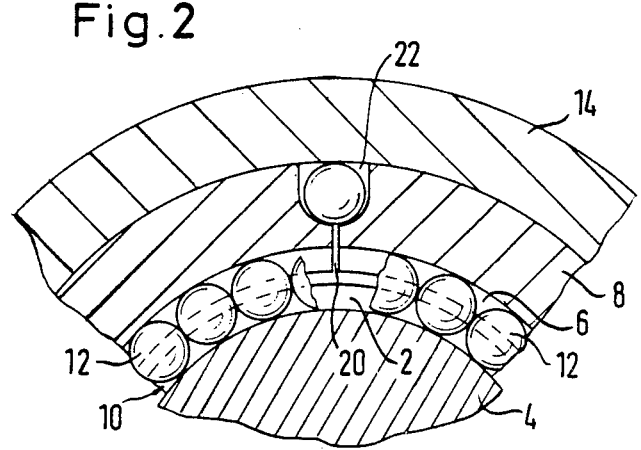
FIG. 2 is a cross-sectional view taken along the line II—II of FIG. 1.

A spindle nut assembly formed in accordance with the present invention shown in FIGS. 1 and 2 will generally comprise a spindle 4 which is provided with an external thread or helical ball guide 2 and a spindle nut 8 which is provided with a complementary or internal thread 6 forming an external helical ball guide. The spindle 4 and the nut 8 when placed together in operative relationship as shown in the drawings will define therebetween a helical ball duct 10, with one side of the ball duct being defined by the external thread 2 of the spindle 4 and with the outer side of the duct 10 being defined by the internal thread 6 of the spindle nut 8.

A plurality of recirculating balls 12 are arranged to travel within the ball duct 10 formed between the threads or guide ways 2,6 and the balls 10 operate to transmit axial forces between the spindle and the spindle nut when the members are rotated relative to each other.

A clamping sleeve 14 is provided surrounding the spindle nut 8 and collets 16 and 18 adapted to be threadedly engaged at wide and narrow ends of the clamping sleeve 14, as shown, serve to effect axial affixation of the spindle nut 8 in the clamping sleeve 14.

As particularly shown in FIG. 2, the spindle nut 8 is slotted at least once by a slot or gap which extends in the longitudinal direction. Thus, at least one slot or gap 20 allows variation of the inner diameter of the spindle nut 8 and thus permits adjustment of radial and axial play between spindle 4 and the spindle nut 8, in a known manner. The means for contracting the diameter of the spindle nut 8 with a greater or lesser degree of compression may be of several selected designs.

FIG. 1 shows that spindle nut 8 is formed with a conical outer surface and that the clamping sleeve 14 is formed with a complementary conical inner surface. By pressing the spindle nut 8 into the clamping sleeve 14, to a greater or lesser depth, the diameter of the spindle nut may be varied with substantial precision. Collets 16 and 18 serve to adjust and affix the axial position of the spindle nut within the clamping sleeve 14. As shown in FIG. 2, a return duct 22 for the recirculating balls is also arranged in the region of the gap or slot 20.

Figure 3:
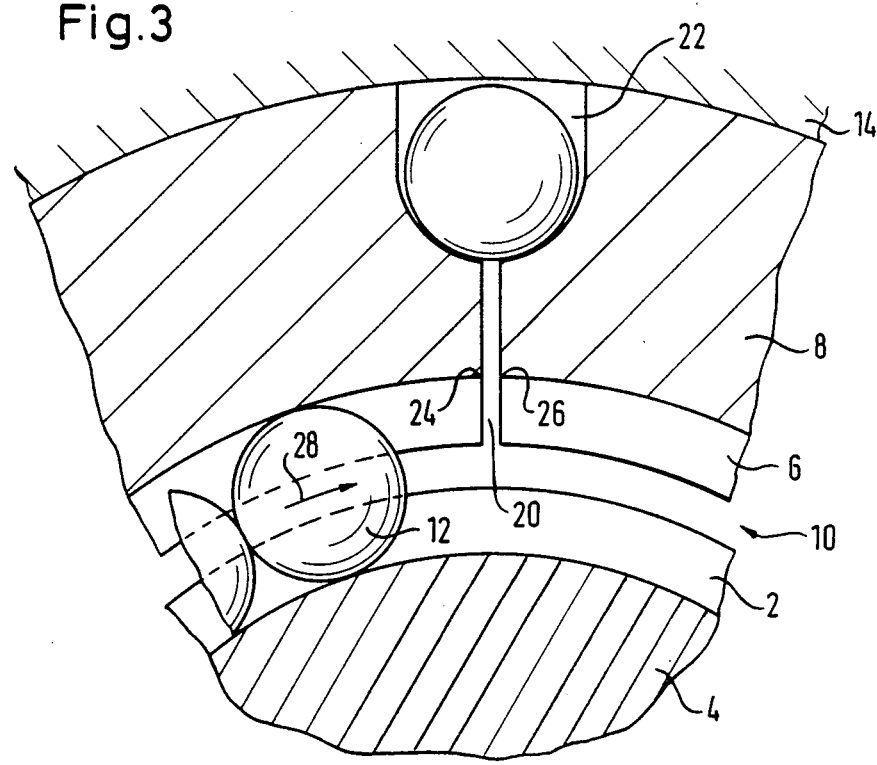
FIG. 3 is a partial sectional view showing a detail from FIG. 2 in a larger scale at the region of the slot formed in the spindle nut.

As particularly depicted in FIG. 3, the slot 20 is formed with a rather small width. In the preferred embodiment illustrated, the width is maintained to be not greater than 10% of the diameter of the recirculating balls. In this manner, a releasing edge 24, which is the terminal edge of the slot 20 first engaged by the recirculating balls 12, and a receiving edge 26, which is a terminal edge of the slot 20 last engaged by the circulating balls when the balls travel in the direction of the arrow 28, will always have a particular distance or gap between each other so that the ball will, from a practical viewpoint, not deviate from its continuous path of travel and thus not lose contact with the external thread or ball guide 2 of the spindle 4 or with the internal thread or ball guide 6 of the spindle nut 8.

Figure 4:
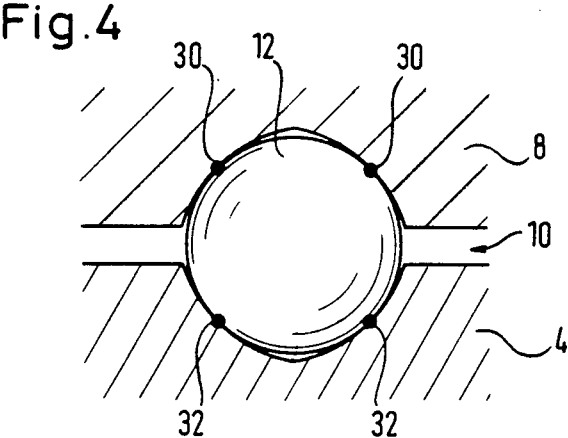
FIG. 4 is a sectional view taken through a ball duct formed between the spindle and the spindle nut.

FIG. 4 shows a cross-sectional view taken through a ball duct 10, with the ball duct 10 being defined between the external thread 2 of the spindle and the internal thread 6 of the spindle nut. FIG. 4 clearly depicts the contact points between the ball 12 and the races formed by the threads of the spindle 4 and the spindle nut 8. As will be apparent from FIG. 4, the balls 12 will virtually always be in contact with each of the threads or guides 2,6 at two points 30 and 32 each located on a side of the ball 12. Accordingly, when the spindle nut 8 is adjusted by compressive application of the sleeve 14 so that play is reduced or eliminated, the balls 12 will be engaged to transmit forces in both axial directions and as a result reverse axial play in the spindle assembly will be virtually completely eliminated.

Figure 5:
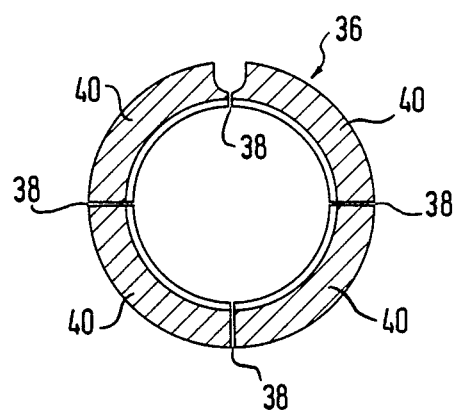
FIG. 5 is a sectional view showing a schematic representation of a spindle nut having a plurality of slots formed in accordance with the invention.

In the simplest embodiment of the invention, the spindle nut may be formed with a single slot 20. Thus, the spindle sleeve or nut 8 will be divided along a surface line in the circumferential direction but it is otherwise constructed as a single unitary piece. Of course, it will be apparent that other embodiments of the invention may be conceived wherein the spindle nut is formed with more than one slot and, for example, the nut may be formed with two slots, as a result of which the spindle nut itself will be constructed in two pieces. FIG. 5 shows an embodiment wherein a spindle nut 36 is divided into four portions 40 by means of four slots 38. An increase in the number of slots ensures more uniform roundness of the spindle nut at various stages of contraction.

Accordingly, in accordance with the present invention, the width of each of the slots of the spindle is maintained to be not greater than 15%, and preferably less than 10%, of the diameter of the recirculating balls 12. When these parameters are observed, rolling or movement of the balls across the slots will occur essentially without jolting or roughness and, accordingly, there will be ensured, even in the case of spindle nuts having a plurality of such slots, a more uniform and smooth operating characteristic for the overall assembly.

In an important feature of the invention, the slot 20 will be maintained with a finite and generally very small width even in the case where maximum contraction of the spindle nut 8 is involved so that it will always be possible to apply a defined stress. It is also important that the cross-section of the groove of the internal thread leads into the slot 20 without widening, as will be particularly noted from FIG. 3.

In accordance with the basic concepts of the invention, further aspects of the invention may be realized. As will be noted, the important parameters of the invention relate to the mutual relationships in the dimensions of the diameter of the spindle, the diameter of the ball and the width of the slot. In the preferred embodiment of the invention, the parameters considered may also include the relative dimensions between the ball diameter and the outermost diameter of the spindle. By maintaining such relative dimensions within certain prescribed limits in accordance with the invention, the width of the slot may be related not only to the diameter of the ball, but also to the outermost diameter of the spindle. In accordance with the preferred embodiment of the invention, the ball diameter is maintained to be not greater than about 20% of the outermost spindle diameter, and preferably about 15% of the spindle diameter. In this manner, the width of the slot is related to be maintained within a certain ratio relative to the ball diameter, and as a result, also relative to the spindle diameter. Thus, the slot width is also maintained as related to the radius of curvature of the ball race. It has been found that a resulting ratio of slot width to spindle diameter of no greater than about 3%, and preferably no greater than about 1.5%, results in a smoother and more even behavior of the assembly of the invention.

In accordance with further details of the invention, mutual relationships between spindle diameter, ball diameter, and slot width may be maintained in accordance with the values set forth below in Table I.

TABLE I

| Spindle Diameter mm | Ball Diameter mm | | Slot Width mm | |
| --- | --- | --- | --- | --- |
| | max. | preferable max. | max. | preferable max. |
| 1. to 20 | 4 | 3 | 0.5 | 0.3 |
| 2. above 20 to 30 | 5 | 4 | 0.6 | 0.4 |
| 3. above 30 to 50 | 8 | 6 | 0.9 | 0.6 |
| 4. above 50 to 80 | 10 | 8 | 1.2 | 0.8 |
| 5. above 80 to 130 | 13 | 10 | 1.5 | 1.0 |

In accordance with the foregoing parameters, if the spindle drive with the recirculating balls is provided with a spindle diameter of, for example, 20 mm, the ball diameter will be about 3 mm which will be 15% of the spindle diameter, and the slot width will be 0.3 mm which will be 10% of the ball diameter or 1.5% of the spindle diameter. The highest possible penetration depth of the ball into the slot will be only about 0.007 mm thereby resulting in a practically jolt-free operating assembly which exhibits smoother running characteristics. By adjusting the play of the assembly to a point where the play is practically eliminated or by a prestressing of the device, the width of the slot may be reduced and thus the penetration depth will also be significantly reduced as compared with the aforementioned values. When the slot width is 0.2 mm or 0.1 mm, the penetration depth will be only about 0.003 mm or 0.001 mm, respectively.

While specific embodiments of the invention have been shown and described in detail to illustrate the application of the inventive principles, it will be understood that the invention may be embodied otherwise without departing from such principles.

What is claimed is:

1. A spindle drive assembly comprising:
a spindle including means defining an external circumferential surface;
a spindle nut completely surrounding said spindle and including means defining a helical internal ball guide completely surrounding said spindle;
said spindle and said spindle nut being operably arranged with said external circumferential surface and said internal ball guide cooperating to form a helical duct adapted to have recirculating balls of said spindle assembly pass therethrough;
a plurality of recirculating balls within said helical duct for transmitting an axial load between said spindle and said spindle nut upon relative rotation therebetween;
ball return means outside said spindle for passing said recirculating balls to and from said helical duct;
clamping means engaging said spindle nut to apply a circumferential tension thereto to maintain said balls in operative load-bearing engagement within said helical duct between said spindle and said spindle nut such as to engage said ball guide in both axial directions; and
means defining at least one substantially axially extending compensating gap in said spindle nut to effect circumferential division of said spindle nut to enable said spindle nut to circumferentially adapt to the circumferential forces applied by said clamping means, said gap having a radially innermost side contiguous with said internal ball guide, said balls running across said radially inner side of said gap and being in said load-bearing engagement also in the area of said radially inner side of said gap, said compensating gap being defined to have a gap width taken circumferentially of said spindle nut at said radially inner side of said gap which is not greater than 15% of the diameter of said recirculating balls.

2. An assembly according to claim 1, wherein said gap width is not greater than 10% of the diameter of said recirculating balls.

3. An assembly according to claim 1, wherein the diameter of said balls is not greater than about 20% of the outer diameter of said spindle.

4. An assembly according to claim 3, wherein the diameter of said balls is not greater than about 15% of the diameter of said spindle.

5. An assembly according to claim 1, 2, 3 or 4, wherein said gap width is not greater than about 3% of the outer diameter of said spindle.

6. An assembly according to claim 5, wherein said gap width is not greater than about 1.5% of the outer diameter of said spindle.

7. An assembly according to claims 1 or 2, wherein the ratios of the outer diameter of said spindle, the diameter of said recirculating balls and the gap width of said compensating gap are in accordance with the following parameters:

| Spindle Diameter mm | Ball Diameter mm | | Gap Width mm | |
|---|---|---|---|---|
| | max. | preferable max. | max. | preferable max. |
| 1. to 20 | 4 | 3 | 0.5 | 0.3 |
| 2. above 20 to 30 | 5 | 4 | 0.6 | 0.4 |
| 3. above 30 to 50 | 8 | 6 | 0.9 | 0.6 |
| 4. above 50 to 80 | 10 | 8 | 1.2 | 0.8 |
| 5. above 80 to 130 | 13 | 10 | 1.5 | 1.0 |

8. An assembly according to claim 7, wherein said compensating gap is formed with a width which is less than about 1 mm, said gap being produced by one of the processes involving wire-eroding, use of laser beams and use of electron beams.

9. An assembly according to claim 1 wherein said circumferential surface is provided with a helical external ball guide, said internal and said external ball guides cooperating to form said helical duct.

* * * * *